United States Patent Office 3,529,746
Patented Sept. 22, 1970

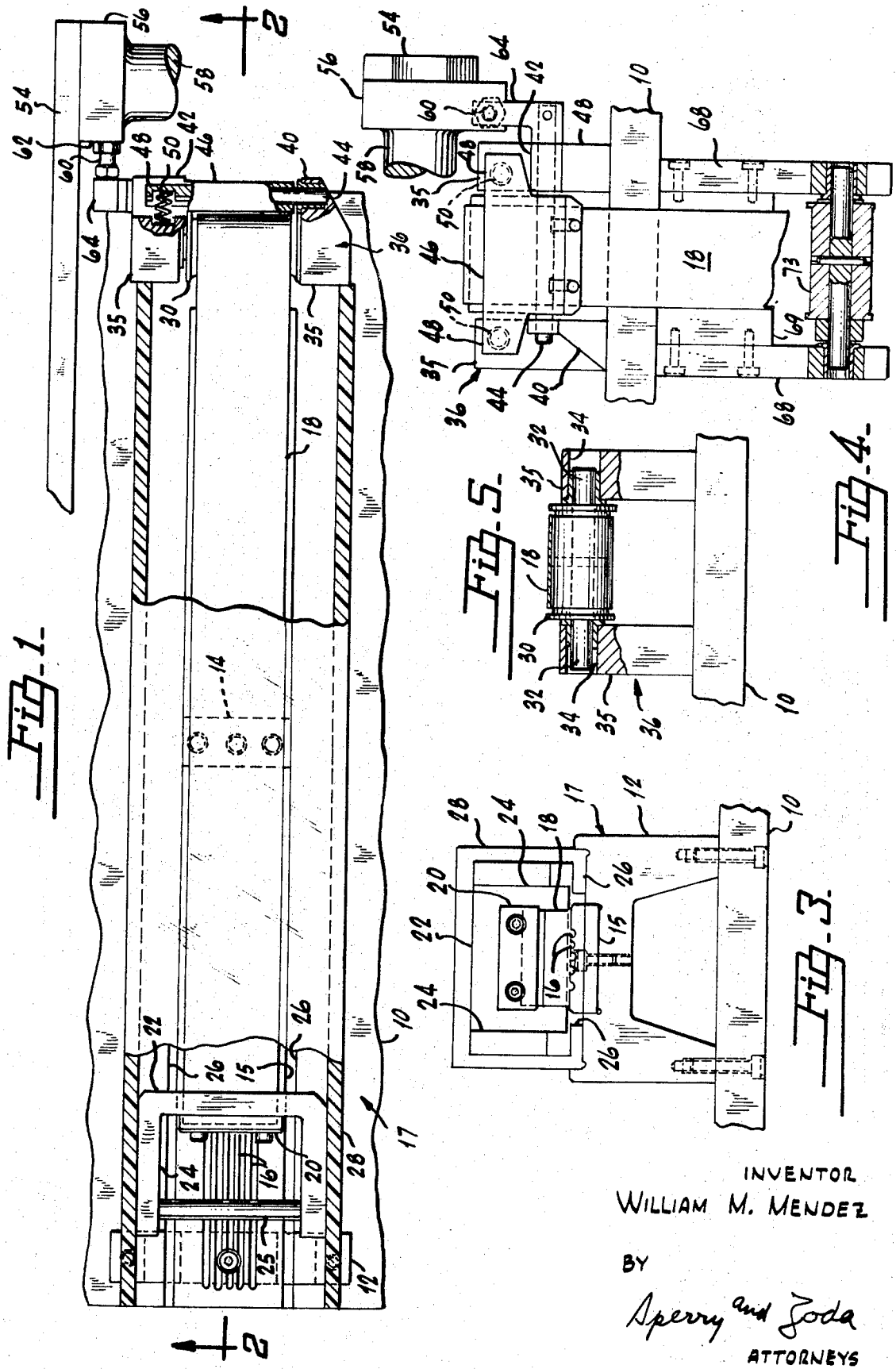

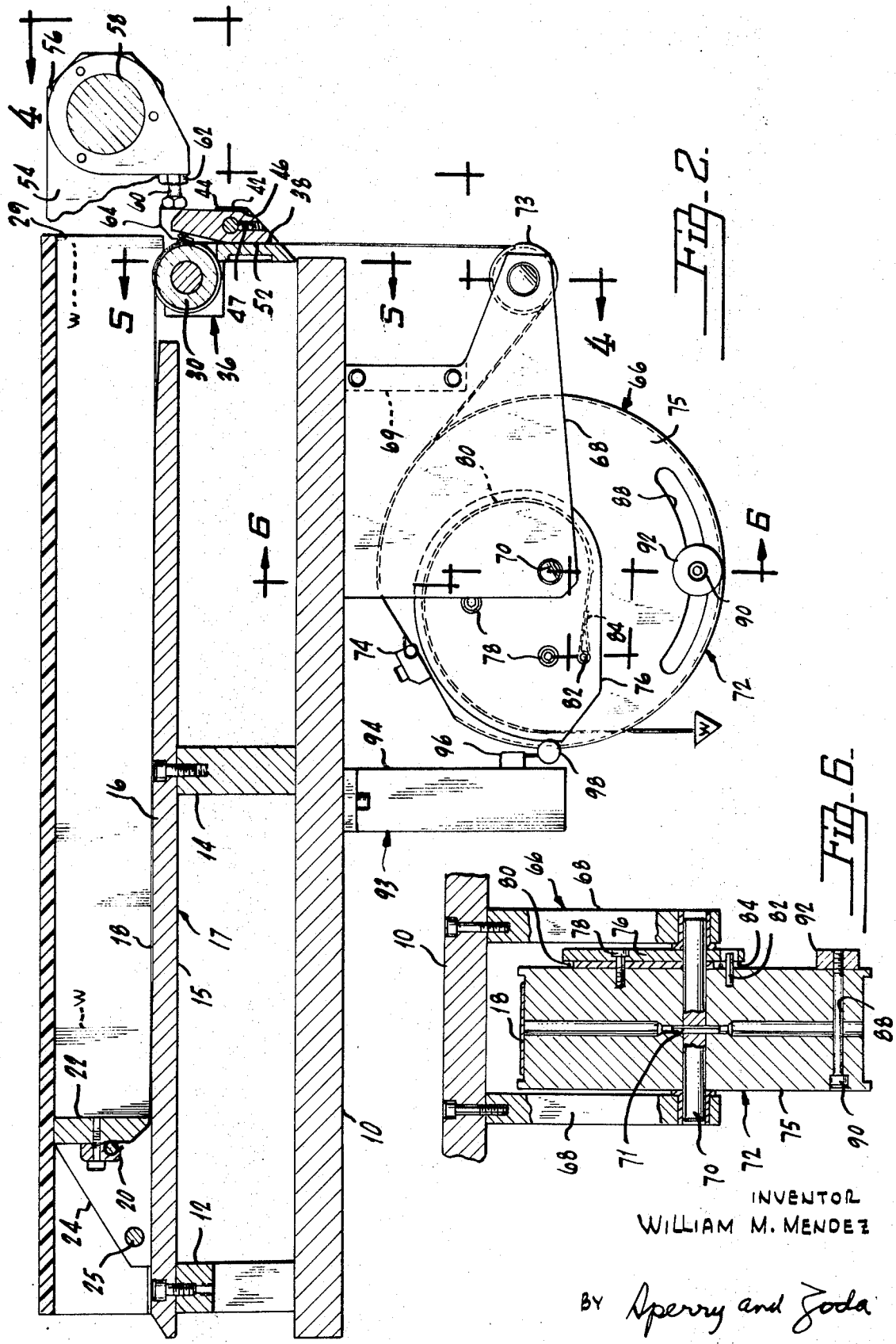

3,529,746
PRESSURE ADJUSTING FEED ASSEMBLY FOR WORK LOADERS OF THE MAGAZINE TYPE
William M. Mendez, Princeton, N.J., assignor to Precision Systems Company, Inc., Somerville, N.J., a corporation of New Jersey
Filed Aug. 7, 1968, Ser. No. 757,192
Int. Cl. B65h 1/08
U.S. Cl. 221—226                                         4 Claims

ABSTRACT OF THE DISCLOSURE

A follower exerts pressure against a supply of workpieces, to feed them from a magazine. A flexible web secured to the follower supports the workpieces. A rewind wheel for the web rotates under the pull of a weight suspended from the wheel by a cord trained about a cam. Due to a continuously changing radius on the cam, the feed pressure on the workpieces is continuously adjusted in compensation for the constant reduction in the number of workpieces. The web is released in timed relation to operation of a workpiece transfer mechanism with which the invention is normally used.

CROSS REFERENCES TO RELATED APPLICATIONS

The present application is related to co-pending application of Ronald F. Pastuszuk, Ser. No. 714,604, filed Mar. 20, 1968. That application included, as one of the component assemblies of a work loader of the horizontal magazine type, a means for feeding workpieces from the magazine to a workpiece transfer mechanism. The present application covers an alternative form of feeding assembly usable to particular advantage with, though not necessarily restricted to use with, said transfer mechanisms.

The present application is further related to co-pending application of Ronald F. Pastuszak, Ser. No. 664,785, filed Aug. 31, 1967, now U.S. Pat. No. 3,441,121, covering a device for rapidly and precisely positioning a succession of small workpieces, in the sense that the present invention covers a feed assembly that is particularly well suited for incorporation in apparatus designed to deliver workpieces to a surface upon which they would be precisely positioned by means of the equipment shown in said co-pending application Ser. No. 664,785.

BACKGROUND OF THE INVENTION

Field of the invention

The invention is in that field of art relating to the feeding of workpieces, particularly thin. flat, wafer-like articles that are to be discharged at regular, timed intervals from a supply or stack for further processing. Usually, upon such discharge, the workpieces are transferred to a surface where they are positioned at uniformly spaced distances apart.

In particular, the feed assembly constituting the present invention is designed for association with equipment the purpose of which is to load onto a dail or conveyor successively following ceramic substrates onto which microcircuits are to be printed.

Description of the prior art

In co-pending application Ser. No. 714,604 referred to above, there is illustrated a horizontal magazine, having a discharge end from which successively following workpieces are fed under pressure, to be picked up by a transfer mechanism used to locate the workpieces upon a dail or other surface, in successively following order and at prescribed distances apart.

In said application 714,604, the workpieces are advanced within the magazine through the provision of a follower, to which is connected a cord exerting pull upon the follower by means of a weight to which the cord is connected. Means is included to pinch the cord in timed relation to the extraction of the workpieces from the discharge end of the magazine by the transfer mechanism disclosed by that application.

The present application is directed wholly to the provision of an improved means for feeding the workpieces within the magazine to the position where, at the mentioned timed intervals, they will be extracted by the transfer mechanism and transferred to a work surface as described above. In the feeding of workpieces such as ceramic substrates for microcircuits, it is very important that there be precise control of the feed pressure, the pressure of the substrates against each other, and the timing of the application of, and the relief of, the pressure against the workpieces as they are advanced to the transfer mechanism. All these matters are extremely important because workpieces of this type are precisely formed, with very close tolerancing. Pressure of contacting workpieces against each other should be light, to prevent damage, and to minimize adherence of adjacent workpieces to each other. Further, it is extremely important that as each workpiece is extracted from the discharge end of the magazine by the transfer mechanism, the next following workpiece should not be under such pressure as would tend to force the same out of the discharge end before the transfer mechanism is ready to pick it up on the next cycle of said mechanism. And, each time that the pressure against the supply of workpieces is applied to advance said supply, care must be taken that said pressure at no time becomes excessive, thus pointing up the obvious desirability that pressure on the workpiece supply be, at all times, constant within extremely close tolerances as regards the feed pressure.

While apparatus such as shown, for example, in the mentioned co-pending application Ser. No. 714,604 have effectively eliminated many of the problems with respect to precise operation in the handling of workpieces of this type, the desirability for even more precise operation has been noted in the art. Further, it has become increasingly important that feeding apparatus of this type be of increased versatility as regards the size and shape of the workpieces handled, the rate of feed thereof, and the pressure with which the same are fed from their magazine. So far as is known, the prior art has not as yet achieved the desired standard of precision and versatility. It may be observed, in this regard, that such standards are being raised constantly.

SUMMARY OF THE INVENTION

Summarized briefly, the invention includes a stationary support structure, having an elongated, horizontally disposed magazine the front end of which is open to permit discharge of the workpieces to positions in which they are picked up by a transfer mechanism such as shown in the mentioned co-pending application Ser. No. 714,604. Within the magazine, a flexible web is movable longitudinally thereof, in supporting relation to the workpieces. The web is connected to a follower, which exerts a pressure upon the rear end of the supply or stack of workpieces, tending to advance the same whenever the web is pulled forwardly within the magazine.

Advancement of the web is achieved through the provision of a rewind drum, rotatably mounted upon the support structure, the web being wound about the drum whereby, on rotation of the drum in one direction, the web will be wound thereupon and hence moved within the magazine together with its follower, to advance the supply of workpieces.

Rotation of the drum is achieved through the provision of a weight, suspended from the drum by means of a cord trained about a cam secured to the drum for rotation therewith. The cam has a surface about which the cord is trained, so disposed in respect to the axis of rotation of the cam and drum as to cause the line of pull exerted by the weight to be moved progressively closer to the drum axis, upon rotation of the drum in the web-winding direction.

By reason of this arrangement, when the magazine has a large number of workpieces, as for example at the beginning of the feeding operation, the vertical line of pull exerted by the weight is radially, horizontally spaced from the drum axis the maximum distance. As a result, the pulling force is at its maximum value, so that the pressure of the follower against the workpieces is also at maximum value.

As the supply of workpieces dwindles, as a result of the removal of successively following workpieces, through the discharge end of the magazine, the line of pulling force moves progressively closer to the drum axis, as a result of which the pressure of the follower upon the workpieces is correspondingly progressively reduced.

This is of importance because the maximum pressure against the workpieces is needed when the supply is at its greatest. If, however, said pressure is maintained at a maximum value, the pressure against each workpiece as it is moved to discharge position would become progressively increased, and this would be undesirable. By reason of the arrangement described, the pressure of the follower against the workpieces is progressively reduced, concurrently with reduction in the total number of workpieces, with the result that the pressure against each workpiece is kept constant, through the entire operation beginning with the feeding of the first workpiece from a large supply to the feeding of the last workpiece in said supply.

The invention further includes means for clamping the web against advancing movement, in timed relation to the removal of each workpiece by the work transfer mechanism, whereby to relieve the workpieces of a feeding pressure until the transfer mechanism is ready to pick up the next following workpiece.

The invention includes a construction such that magazines may be interchangeably used, together with their associated followers, so as to accommodate substrates of various sizes and shapes. The invention further includes means for adjusting the extent to which the web may be wound, before shutting off of the apparatus, and adjustments are also provided to permit selective variation of the extent to which the web is permitted advancing movement between intervals when it is clamped against such movement, thus accommodating the apparatus to the handling of workpieces of various thicknesses. Further, interchangeable cams and weights are allowed to facilitate adjustments as further made necessary by different sizes, thicknesses, and quantities.

BRIEF DESCRIPTION OF THE DRAWING

FIG. 1 is a top plan view, in which parts are shown in horizontal section and other parts are broken away, of a feed assembly according to the present invention;

FIG. 2 is a longitudinal sectional view substantially on line 2—2 of FIG. 1;

FIG. 3 is a rear end elevational view of the feed assembly, as seen from the left of FIG. 2;

FIG. 4 is a front end elevation, partly in section, substantially on line 4—4 of FIG. 2;

FIG. 5 is a transverse section at the front end of the magazine, substantially on line 5—5 of FIG. 2; and FIG. 6 is a transverse sectional view through the web-advancing assembly substantially on line 6—6 of FIG. 2.

DESCRIPTION OF THE PREFERRED EMBODIMENT

Referring to the drawing in detail, a flat, horizontal base plate 10 is provided, on which are fixedly mounted upstanding supports 12, 14. Fixedly mounted upon the supports 12, 14, and elevated thereby above base 10, is an elongated feed table or web support plate 15 preferably formed with a series of parallel, closely spaced grooves 16 extending substantially for the full length thereof. Base plate 10, supports 12, 14 and plate 15 together define a support structure which has been generally designated 17, and which would carry not only the feed assembly, but also, remaining components of the apparatus such as have been shown in the mentioned co-pending application 714,604. Since the present invention is concerned entirely with the feed assembly whereby workpieces W are fed from a magazine, all other components, such as the work transfer mechanism, etc., have been omitted from the drawing. It will be understood, however, that such components can be of the type shown in the co-pending application Ser. No. 714,604, although they could also be of other types since the present assembly has general application wherever workpieces are to be fed from a horizontal magazine at predetermined intervals in successively following order.

An elongated, flexible web 18 in the present instance is formed as a flat, wide belt, and in a typical commercial embodiment might be of woven or solid plastic material, or very possibly, said web might be a thin metallic material. It is mainly important that the web have the desired characteristics, and minimal frictional adherence to the workpieces W supported thereby.

The web 18, as will be noted from FIG. 1, in width extends substantially the full distance across the support plate 15, and at its rear end, is affixed through the provision of a clamp plate 20 to a follower 22 extending transversely of the plate 15, web 18, and the magazine for the workpieces, said follower being formed with rearwardly directed wings or side walls 24 between which a handle 25 can be extended. Handle 25 facilitates grasping of the follower for the purpose of removing the same through the rear end of the magazine, when the magazine is to be reloaded, or when a follower of different shape or size is to be substituted.

The wings 24 are slidably supported upon inturned longitudinal bottom flanges 26 (see FIG. 3) of an elongated, open-ended magazine 28 the front end of which has a discharge opening 29.

The magazine can be formed of material such as a transparent plastic, in a preferred embodiment, whereby visual observation of the workpiece supply can be had. This, of course, is not critical to successful operation of the invention, however, and the magazine can obviously be of other materials, and for that matter, of other cross-sectional shapes than the rectangular cross-section illustrated by way of example. The cross-sectional shape of the magazine would depend, obviously, upon the particular configuration of the workpieces housed therein during operation of the equipment. This, in fact, is an important feature of the invention, that is, the magazine can be removed bodily from its position upon the supports, 12, 14, and can be substituted for whenever desired, by a magazine of different cross-sectional shape and/or size.

In any event, the magazine is so proportioned as to receive a supply of workpieces W, with the side edges and top edges of said workpieces being in closely spaced relation to the side and top walls, respectively, of the magazine. The workpieces, in a working embodiment of the invention, might be in very light contact with the magazine. This contact sets up a certain amount of frictional resistance to the feeding of the workpieces, and obviously, the greater the number of workpieces remaining within the magazine, the greater will be said frictional resistance. This, together with the weight of the total number of workpieces remaining in the magazine, affects the amount of pressure that should desirably be exerted against the back end of the supply of workpieces W by the follower.

The supporting of the workpieces directly upon the web, however, is an important improvement of the present construction over the feeding arrangement shown in the co-pending application Ser. No. 714,604. In that application, the workpieces were pushed directly along a stationary surface upon which they were supported, in direct contact with said surface. This obviously produced a substantial amount of friction, which was found undesirable in precision operation such as is desirable in the feeding of ceramic substrates used in the manufacture of micro-circuits. In the present instance, the workpieces are supported at their bottom edges directly upon the web, moving with the web and follower toward the front discharge end of the magazine during the normal operation of the device, thus minimizing friction as compared to the high resistance resulting from an arrangement in which the workpieces are dragged along a stationary supporting surface with which they are in direct contact.

Spaced forwardly from the front end of the feed table 15 is a transversely extending idler or roller 30, pinned to a shaft 32, the opposite ends of which are journaled in bearing openings 34 formed in the side walls 35 of a front end support bracket 36 upon which the forward end of the magazine is supported. Bracket 36 includes a transversely extending guide wall 38, slidably contacted by the web 18. At opposite sides of wall 38 bracket 36 has forwardly extending bearing projections 40, 42, in which the opposite ends of a shaft or pin 44 are journaled. Shaft 44 extends through a clamp plate 46 supported by the shaft directly in front of wall 38 with web 18 extending therebetween.

Clamp plate 46 is secured to shaft 44 for rocking motion therewith, through the provision of set screws 47. Referring now to FIG. 4, clamp plate 46 is provided with laterally extending wings 48 at its opposite sides, having recesses receiving compression coil springs 50, the other ends of which (see FIG. 1) are seated in complementary recesses opening forwardly within the respective side walls 35 of bracket 36.

The springs, normally tending to expand, bias the clamp plate to the position shown in FIG. 2. In this position, a clamping surface 52 of plate 46 is caused to bear heavily against web 18, so that the web is clamped or pinched between the surface 52 and the guide wall 38 of the front end bracket 36. In these circumstances, web 18 is prevented from being advanced upon table 15, so that the workpieces are stationary, with no pressure thereon tending to move the same toward or through discharge opening 29.

Fixedly mounted upon the base, laterally of and parallel to the magazine, is a forwardly projecting support bar or rail 54 on which is rotatably mounted the head 56 of a rock shaft 58. Shaft 58 is shown only fragmentarily, but would be connected to the plunger of an air cylinder or the like, by means of a motion translating connection, not shown, in such fashion as to cause the shaft 58 to be oscillated at periodic intervals, in timed relation to operation of a work transfer mechanism, such as shown in the co-pending application Ser. No. 714,604. The work transfer mechanism, as will be understood, would be cycled in such manner as to pick up the forwardmost workpiece located at the discharge opening, tranfered to a work surface such as a dial (also not shown), and then returned to pick up the next workpiece. Meanwhile, the workpieces would be advanced, awaiting said next pick up cycle.

Until the work transfer mechanism is ready to pick up the next workpiece, pressure upon the entire supply is relieved. Said pressure is permitted only when the transfer mechanism is disposed directly in front of opening 29, ready to accept the next workpiece.

Thus, clamp plate 46 would be in the FIG. 2 position thereof at all times when the work transfer mechanism has moved away from the discharge opening 29, as for example, when it is carrying a workpiece to its proper location upon the adjacent dial.

In timed relation to the return of the work transfer mechanism to pick up the next workpiece, the rock shaft 58 is rocked clockwise in FIG. 2.

Carried by head 56 is a rearwardly extending pin 60, the position of which within head 56 can be adjusted through the provision of a threaded connection between said pin and the head. In each position of adjustment selected for the pin 60, a nut 62 can be employed to lock the pin in position.

The rear, free end of pin 60, when shaft 58 is rocked clockwise as described above, engages an upwardly projecting arm 64 that is secured fixedly to the shaft 44 of clamp plate 46, and extends radially therefrom. Arm 64 is swung rearwardly, that is, to the left in FIG. 2, from the normal position thereof shown in FIG. 2. The result is that against the force of springs 50, clamp plate 46 is rocked to a position in which surface 52 thereof moves away from the web 18, freeing the web for movement. In these circumstances, the workpieces are again under pressure from the follower 22, tending to shift the workpieces toward the discharge opening and in this way move the forwardmost workpiece into position where it will be picked up by the work transfer mechanism, which as noted above would now be disposed in its pick-up position in front of discharge opening 29 of the magazine.

Concurrently with removal of the forwardmost workpiece W, shaft 58 is rocked back to its normal position, permitting springs 50 to expand since pin 60 will now be shifted back to its FIG. 2 position. Web 18 will thus once again be clamped against advancement.

Designated generally at 66 is a feed control drum assembly. This is carried by the base plate 10, being disposed wholly below the base plate.

Assembly 66 includes a pair of parallel, transversely spaced drum support plates 68 depending from and fixedly connected to the underside of base plate 10. Extending between and secured fixedly to the support plates 68 is a cross plate 69.

A drum shaft 70 is journaled at its ends in and extends between the respective plates 68, and is pinned as at 71 to a rotary element generally designated 72.

Web 18, after being trained about the upper idler roller 30, extends downwardly therefrom and is trained about a lower idler 73, pinned to a shaft the ends of which (see FIG. 4) are journaled in bearings carried by the projecting front ends of the plates 68.

After being trained about idler 73, the belt extends rearwardly upwardly, and is extended along the periphery of the rotary element 72, to which it is fixedly connected or anchored by means of a clamp 74.

The rotary element includes as a main component thereof rewind drum 75, this being the large diameter portion of the rotary element to which the web 18 is clamped. Rotary element 72 further includes a cam 76, removably but fixedly connected to one side of drum 75, as shown in FIG. 6 and also in FIG. 2, by means of spaced screws 78.

Cam 76 is in the form of a flat plate, having a continuously curved cam surface 80.

As shown in FIGS. 2 and 6, a pin 82 is extended laterally outwardly from the side of the drum 75 to which the cam 76 is affixed, and serves to anchor a cord 84 at one end to the rotary element 72. Cord 84, from the point at which it is so anchored, is extended about the cam, in contact with the cam surface 80 thereof, and upon leaving contact with the cam (see FIG. 2) extends downwardly and is connected at its other end to a weight 86.

Weight 86, thus suspended from the rotary element 72, provides a force effective to rotate element 72 counterclockwise in FIG. 2, to wind the web 18 about the drum 75, in this way imparting linear movement to the upper portion of the web 18 that overlies table 15, to the right in FIG. 2, whereby follower 22 and web 18 advance the workpieces W in the manner previously described herein.

In the illustrated example, the counterclockwise rotation of drum 75 in the web-winding direction is limited to travel through 270° from the start position shown in FIG. 2. In the illustrated example, this is sufficient travel to advance follower 22 from the start position shown to a final position, not shown, at which it is determined that the magazine should be reloaded with a fresh supply of workpieces W.

To limit the drum rotation in this manner, there is provided an arcuate adjustment slot 88, curved about the axis of rotation of the drum, and disposed inwardly from the periphery of the drum a short distance. Referring to FIG. 6, a screw 90 is extended through the slot, and threaded upon the laterally projecting end of the screw is a circular sleeve 92.

Under the pull of weight 86, the counterclockwise rotation of drum 75 is effected, and the drum will continue to rotate to wind the web and hence advance the workpieces until the sleeve 92 has traveled through 270°, and engages a limit switch which operates to cause the air cylinder, not shown, that controls the oscillatory motion of rock shaft 58, to cease operation. As a result, clamp plate 46 remains in its clamping position shown in FIG. 2, and is no longer rocked to a release position. Feeding of the workpieces W stops, and the magazine is reloaded with a fresh supply.

The limit switch means has been generally designated 93, and includes a depending bracket 94 of inverted L-shape affixed to the underside of base plate 10. A switch 96 is mounted upon bracket 94, and includes an actuating arm 98 provided with a rounded head in the path of the sleeve 92. Accordingly, when the drum has turned through the permitted extent of angular travel, in the present instance 270°, sleeve 92 will cam switch arm 98 to a position effective to operate the switch and to shut down the apparatus for reloading the magazine.

Through the provision of the adjustment slot 98, the switch-actuating projecton or sleeve 92 can be adjusted circumferentially of the drum. This in turn adjusts the extent of angular travel which the drum is permitted, according to the length of the workpiece load within the magazine, which as understood determines the extent of web movement appropriate for the particular situation.

Cam surface 80, as previously mentioned herein, curves about the axis of rotation of the drum. It is importance to note, in this regard, that said cam surface is so curved eccentrically to the drum center, upon a radius R which when measured horizontal between the rotation axis of the rotary element, and point P at which the flexible element or cord 84 leaves contact with cam surface 80 to extend downwardly to the weight, becomes progressively shorter during the counterclockwise rotation of the rotary element.

It is thus apparent that when the parts are in their initial position shown in FIG. 2, ready to begin the feeding of the workpieces of a fresh supply thereof loaded in the magazine, radius R measured along the specified line is at its longest. Stated otherwise, the vertical path along which weight 86 exerts a pulling from upon the rotary element is at this time at a maximum distance, measured radially of the drum axis along a line normal to said path, from said axis.

At this time, the value of the pulling force is at its greatest, and this is important because there is a full load of workpieces W, the weight of which, and the frictional resistance to movement of which, are at maximum value. Therefore, there should be a predetermined pressure exerted by follower 22 against the workpieces, selected according to said maximum weight and friction values, such that the forwardmost workpiece will be advanced gently to its pick-up position.

As the workpieces are fed, the total weight of the stack, and the mentioned frictional resistance thereof to advancing movement, are continuously, progressively reduced. The reduction is in very small increments, each increment being the weight and frictional resistance subtracted responsive to the removal of a single workpiece from the front end of the magazine.

The pressure of follower 22 against the workpieces, however, is being reduced, at the same time, by correspondingly small predetermined increments, by reason of the fact that the counterclockwise rotation of drum 75 causes the vertical path of pulling force exerted upon the drum to move progressively closer to the drum axis. Each shortening of radius R, as the feeding operation continues, is effective to reduce the feeding pressure exerted by follower 22, and as a result the pressure against the workpieces is effectively kept constant, despite the continuing progressive reduction in the total weight and frictional resistance of the magazine load. The pressure against the last workpiece to be moved to pick-up position is the same as the pressure exerted against the first workpiece so moved, within a closely toleranced, acceptable range of pressures.

It may be further noted that a work transfer mechanism, not shown in the present application, but shown in full detail in co-pending application Ser. No. 714,064, would generally be employed with the feeding device that is the subject of the present application. Said mechanism would be cycled in timed relation to the operation of clamp plate 46 between its clamping and release positions. Each time the pick-up mechanism has moved to a position adjacent discharge opening 29 and is ready to pick up the next workpiece, plate 46 is operated momentarily to release position, permitting weight 86 to rotate the drum a distance effective to advance the forwardmost workpiece W to pick-up position. As said workpiece is removed by the transfer mechanism, the plate 46 is returned to clamping position and remains in this position to prevent rotation of the drum until such time as the work transfer device is ready to pick up the next piece.

Certain advantages of the device may be noted, as for example, the arrangement wherein the workpieces ride upon and with the web minimizes friction as compared to arrangements such as shown in co-pending application Ser. No. 714,604. Also, precision feeding is achieved, with the pressure on the workpieces used to feed the same being kept at a constant value, within very close tolerances, no matter what the number of workpieces remaining in the magazine may be.

Additionally, the device can be readily timed or controlled along with cooperating adjacent components such as the mentioned transfer mechanism, as for example by a single main air cylinder and appropriate, cooperating valves or switches.

Still further, wide and easily worked adjustments in pressure against the work can be swiftly and easily effected, according to the needs dictated by the different substrate shapes and sizes. This is achieved by full interchangeability of weights 86, independent of or in co-operation with full interchangeability of cams 76.

Further, the force available can be either linear or non-linear, since the cam shape can be varied according to the number or shape of the workpieces.

Further, the clamping action, being across the full width of a wide flat web 18, is effective as to completely isolate the workpieces from the weight system. And, whereas in other devices there was a high initial load to be relieved, in the present case there is a much lower initial load, and compressive force against the workpieces is held to a desirably low value, even at the start of the operation.

I claim:

1. A feed assembly for a work loader of the magazine type, comprising:
   (a) a magazine having a discharge opening;
   (b) workpiece feed means including a flexible web extending within the magazine in supporting relation to a supply of workpieces loaded into the magazine, said means exerting a pressure on the workpieces to advance the same toward the discharge opening in response to advancement of the web;
(c) means for advancing the web; and
(d) means to adjust the feed pressure on the workpieces concurrently with advancement of the web, said means for advancing the web including a rotary element upon which the web is wound, and means to rotate said element in a direction to wind the web thereon, the means for rotating said element including a flexiible member having a connection with said element effective to rotate the same responsive to the application of a force applied to said member in a direction away from the rotary element, and means connected with said members and applying said force thereto, said feed-pressure-adjusting means including a cam surface upon said element, said member being trained about said surface and said surface being at a distance from the rotational axis of the element which when measured along a pre-determined radius of the element, is progressively reduced during rotation of the element in said direction, whereby to correspondingly reduce the rotational force exerted upon said element concurrently with reduction of the number of workpieces in the magazine.

2. A feed assembly as in claim 1 wherein the axis of rotation of said element and of its cam surface is horizontal, said means connected with the flexible member being a weight suspended by said member from the rotary element.

3. A feed assembly as in claim 2 wherein the cam surface is curved about the axis of rotation of said element, upon a radius which when measured horizontally between said axis and a point at which the flexible member leaves contact with the surface to extend to the weight, becomes progressively shorter during rotation of the element in a direction to wind the web thereon.

4. A feed assembly for workpieces comprising:
(a) a support structure including a horizontal feed table upon and along which a supply of workpieces may be advanced;
(b) a flexible web mounted on the table in supporting relation to the workpieces and movable along the table to feed the workpieces from the table;
(c) a follower connected to the web and movable therewith along the table in engagement with the supply of workpieces to prevent relative slippage between the web and workpieces and exert a constant pressure on the workpieces in a direction to feed the same from the table;
(d) a drum rotatably mounted on said structure, said web being wound upon the drum to move the web in a workpiece-feeding direction upon rotation of the drum in a given direction;
(e) a cam on the drum having a surface radially spaced from the drum axis and curved eccentrically to said axis;
(f) a cord trained about said surface; and
(g) a weight suspended from the drum by said cord to exert a pulling force upon the drum at a location spaced radially from its axis tending to rotate the same in said given direction, said cam surface arranged to progressively move said location closer to the drum axis during said rotation so as to in turn progressively reduce the pressure of the follower on the workpiece supply as the number of workpieces remaining to be fed from the table becomes smaller.

References Cited

UNITED STATES PATENTS

| | | | |
|---|---|---|---|
| 1,877,050 | 9/1932 | Ray | 221—279 X |
| 2,806,631 | 9/1957 | Van Vactor | 221—279 X |

FOREIGN PATENTS 212,218   7/1909   Germany.

SAMUEL F. COLEMAN, Primary Examiner

U.S. Cl. X.R.

222—392